United States Patent [19]

Young

[11] Patent Number: 4,572,858

[45] Date of Patent: Feb. 25, 1986

[54] PROCESS FOR TEXTURIZED BLOWN FILM AND RESULTING PRODUCT

[75] Inventor: Chi C. Young, Gulf Breeze, Fla.

[73] Assignee: American Cyanamid Company, Stamford, Conn.

[21] Appl. No.: 674,431

[22] Filed: Nov. 23, 1984

[51] Int. Cl.$^4$ .............................................. B32B 3/00
[52] U.S. Cl. .................................... 428/141; 264/51; 264/53; 264/288.8; 428/131; 428/422; 428/910
[58] Field of Search ............... 428/131, 141, 422, 910; 264/51, 53, 288.8

[56] References Cited

U.S. PATENT DOCUMENTS

| | | | |
|---|---|---|---|
| 3,081,519 | 3/1963 | Blades et al. | 264/209.1 |
| 3,403,203 | 9/1968 | Schirmer | 264/321 |
| 3,539,666 | 11/1970 | Schirmer | 264/210.1 |
| 3,655,498 | 4/1972 | Woodell | 264/205 |
| 3,896,204 | 7/1975 | Goodman et al. | 264/211 |
| 4,085,175 | 4/1978 | Keuchel | 264/210.7 |
| 4,094,948 | 6/1978 | Blickenstaff | 264/211 |
| 4,128,689 | 12/1978 | Heaps et al. | 264/211 |
| 4,163,770 | 8/1979 | Porosoff | 264/211 |
| 4,301,112 | 11/1981 | Zwick | 264/564 |

Primary Examiner—William J. Van Balen
Attorney, Agent, or Firm—Michael J. Kelly

[57] ABSTRACT

A process for preparing a blown film having both a texturized surface and a fibrous web reinforcement without special processing to produce such features and the blown film per se are disclosed wherein a polymer composition comprising a major amount of one or more polymers selected from acrylonitrile and olefin polymers and an effective amount of a polytetrafluoroethylene emulsion in the form of an assisted melt obtained using a polymer solvent alone or a combination of a major proportion of polymer solvent and a minor proportion of a melt assistant is extruded through a film-forming die directly into a solidification zone pressurized with vapor of polymer solvent and/or melt assistant under conditions which produce a foamed structure and biaxially orienting said structure while it remains within said solidification zone.

8 Claims, No Drawings

PROCESS FOR TEXTURIZED BLOWN FILM AND RESULTING PRODUCT

BACKGROUND OF THE INVENTION

It was previously known that biaxially oriented acrylonitrile polymer film could be produced from a melt composition of acrylonitrile polymer, see M. M. Zwick, U.S. Pat. No. 4,301,112, issued Nov. 17, 1981. It was also known that polyolefins in the form of diluted melts could be extruded to form fibrillated strands, see H. Blades et al., U.S. Pat. No. 3,081,519, issued Mar. 19, 1963. R. A. Blickenstaff, U.S. Pat. No. 4,094,948, issued June 13, 1978, teaches spinning water-assisted acrylonitrile polymer melts. A. Goodman et al., U.S. Pat. No. 3,896,204, issued July 22, 1975, teaches an improvement in the Blickenstaff process wherein the acrylonitrile polymer melt is obtained with the assistance of water and a small amount of a compatible solvent for the polymer. H. Porosoff, U.S. Pat. No. 4,163,770, issued Aug. 7, 1979, teaches spinning fusion melts of acrylonitrile polymer and water into a steam-pressurized solidification zone wherein the resulting filament is stretched.

H. G. Schirmer, U.S. Pat. No. 3,403,203, issued Sept. 24, 1968, teaches a non-woven fabric-like member which comprises mixing a blowing agent with a normally solid thermoplastic polymer at elevated temperature, heating the mixture in a confined zone at a temperature above the softening point of the polymer and at an elevated pressure sufficient to prevent expansion of the blowing agent gas, extruding the mixture through an annular die into an area of reduced pressure thereby forming a tubular shaped cellular structure, immediately inflating the tube by interiorly applying fluid pressure sufficient to rupture a substantial portion of the cells and form a non-woven fabric-like member, restricting the flow of fluid from within the resultant porous fabric-like member by enclosing at least the portion of the inflated tube with ruptured cells with a fluid impermeable member to reduce the loss of fluid pressure and deflating and cooling said tube below the softening point thereof.

H. G. Shirmer, U.S. Pat. No. 3,539,666, issued Nov. 10, 1970, teaches a variation of U.S. Pat. No. 3,403,203 in which the inflated tube is drawn over a shaped surface.

R. Woodell, U.S. Pat. No. 3,655,498, issued Aug. 11, 1972, teaches a process for preparing plexifilamentary structures which involves a flash extrusion process wherein a non-crystalline synthetic organic polymer in a liquid solvent under superatmospheric pressure and at a temperature in excess of the boiling point of the liquid solvent at atmospheric pressure is extruded through an orifice into a region of lower pressure. The flash evaporation of the solvent precipitates the polymer in the form of numerous fibrils which are interconnected at their ends in a three-dimensional array to form a flexifilamentary product.

H. W. Keuchel, U.S. Pat. No. 4,085,175, issued Apr. 18, 1978, teaches a process for producing a non-woven fibrous network comprising extruding a mixture of molten thermoplastic polymer and a foaming agent radially under compression through a circular die having a die gap transverse to the axis of the die head, applying radial stress to attenuate the polymer to form a molten fibrous cellular extrudate, maintaining radial stress over the molten extrudate to further attenuate said extrudate, quenching the extrudate to a temperature below its melting or flow temperature and further radially stretching said extrudate to provide a balanced non-woven fibrous network. The polymer forms a pure melt and, preferably, the foaming agent is blown into the melt during processing. Stretching of the film is in the radial direction and in the machine direction upon wind-up of the flattened film drawn at an angle of 75°–125° to the radial direction.

In Japanese Patent No. 83,205,503, a mixture of 80 weight percent cellulose acetate and 20 weight percent polydifluoroethylene in dimethyl formamide is spread on a glass plate and dried. The dried film is removed from the plate and stretched to produce a porous membrane used to separate kerosine and water.

In spite of the above-enumerated efforts in producing porous films, none of which have proven to be of substantial commercial interest, there continues to exist the need for improved processes therefor and for improved products resulting therefrom. The development of such process and product would fulfill a long-felt need and constitute a significant advance in the art.

SUMMARY OF THE INVENTION

This invention relates to a biaxially oriented foamed film having an inherent textured surface and an inherent fibrous web reinforcement comprising a major amount of one or more polymers selected from acrylonitrile and olefin polymers and a minor amount of polytetrafluoroethylene, the amount of polytetrafluoroethylene being sufficient to provide said inherent properties. The invention also relates to a process for preparing a foamed film having both a texturized surface and a fibrous web reinforcement which arise spontaneously in processing which comprises: preparing an assisted melt polymer composition of an effective amount of a polytetrafluoroethylene emulsion and the balance of one or more polymers selected from acrylonitrile and olefin polymers, said melt being obtained by using a polymer solvent alone, or a combination of a major amount of polymer solvent and a minor amount of melt assistant, in amounts in sufficient to dissolve said polymer composition at ordinary temperature and pressure and, at a temperature above the boiling point of said polymer solvent or combination of polymer solvent and melt assistant at atmospheric pressure and at a pressure at least equal to autogenous pressure; extruding said melt through a film-forming die directly into a solidification zone pressurized with vapor of polymer solvent and/or melt assistant under conditions which produce a foamed film structure while enabling biaxial orientation of said film to be effected; and biaxially orienting said film structure while it remains within said solidification zone.

DESCRIPTION OF THE INVENTION INCLUDING PREFERRED EMBODIMENTS

In accordance with the present invention, a polymer composition in the form of an assisted melt is prepared. The polymer composition comprises a major amount of one or more polymers selected from acrylonitrile and olefin polymers and a minor amount of polytetrafluoroethylene, the amount of polytetrafluoroethylene being sufficient to provide the inherent textured surface and inherent fibrous web reinforcement that characterize the foamed film which results from processing as described. Generally, the amount of polytetrafluoroethylene will be at least about 0.5, preferably at least about 1.0 weight percent of the polymer composition. Higher amounts may also be used, if desired, but are generally not necessary and are avoided due to excessive costs.

In preparing the assisted melt, the polymer composition and a suitable solvent, or mixture of solvent and a melt assistant, are heated together under at least autogenous pressure to a temperature above the boiling point of the solvent, or solvent/melt assistant combination, at atmospheric pressure. The amount of solvent, or solvent/melt assistant combination, employed is insufficient to dissolve the polymer composition at atmospheric pressure up to the boiling point of the solvent, or solvent/melt assistant combination, and will only effect liquifaction of the polymer composition at the elevated temperature and pressure. The melt assistant preferably should be compatible with the polymer solvent and the resulting melt should be substantially homogeneous. The amounts of polymer or solvent/melt assistant are within the purview of the prior art cited above.

A melt assistant is a non-solvent for the polymer at ordinary temperature and pressure and only provides the assisted melt, at elevated temperatures and pressures, in conjunction with the polymer solvent. A polymer solvent at proper concentration will dissolve the polymer at ordinary temperature and pressure but, as indicated, is employed at insufficient concentration to effect solution at ordinary temperature and pressure. A melt assistant for one polymer type may be a polymer solvent for another type. Similarly, a polymer solvent for one polymer type may be a melt assistant for another polymer type. Useful polymer solvents and melt assistants for various polymer types are well-known in the art.

Included among useful polymer solvents and melt assistants for the polymer compositions of the present invention, depending upon specific polymers employed, are the following: aromatic hydrocarbons such as benzene, toluene, etc.; aliphatic hydrocarbons such as butane, pentane, hexane, heptane, octane, and their isomers and homologs; alicyclic hydrocarbons such as cyclohexane; unsaturated hydrocarbons; halogenated hydrocarbons such as methylene chloride, carbon tetrachloride, chloroform, ethyl chloride, methyl chloride; alcohols; esters; ketones; nitriles; amides; fluorocarbons; sulfur dioxide; carbon disulfide; nitromethane; decalin; dimethyl foramide; propylene carbonate; dimethyl sulfoxide; 2-pyrrolidone; ethylene carbonate; propiolactone; gamma-valerolactone; delta-valerolactone; gamma-butyrolactone; dimethyl acetamide; N-acetyl morpholine; methyl ethyl sulfone; tetramethylene sulfone; methyl ethyl sulfoxide; tetramethylene sulfoxide; dimethyl sulfone; water; and the like and mixture of the above.

Acrylonitrile polymers that may be used in accordance with the present invention include homopolyacrylonitrile and copolymers of acrylonitrile containing at least about 40 weight percent, preferably about 80 weight percent acrylonitrile and any balance of one or more monomers copolymerizable therewith as are known in the art. Such polymers should be film-forming as should the olefin polymers. Olefin polymers useful in the present invention include polyethylene, polypropylene, etc., as well as mixed olefin polymers. The various polymers may be used singly or in combination.

After the assisted melt is prepared, it is extruded through a film-forming die directly into a solidification zone maintained under conditions which enable phase reversal of the melt to occur with controlled foaming of the film being effected by partial vaporization of the solvent or solvent/melt assistant combination. By "phase reversal" is meant that the components of the melt revert to their original states, the polymer becoming solid and the solvent or solvent/melt assistant combination becoming a separate fluid phase partially contained within the polymer structure. The conditions within the solidification zone are also such that the film can be subjected to biaxial orientation while it remains within the zone.

As the polymer composition is extruded through the film-forming die, gas under pressure is charged into the center of the die so as to effect transverse expansion of the film as it forms, thus providing transverse orientation. The film is drawn by a set of pinch rolls or other suitable means which stretch the film in the machine direction for orientation while at the same time providing a pressure seal for expansion of the film in the transverse direction. A surprising feature of the present invention is the fact that the foamed film can be expanded in the transverse direction to a far greater extent than indicated by its maximum draw-down stretch, i.e. machine direction stretch.

Conditions in the solidification zone may vary widely depending upon the composition being processed and the results desired. The solidification zone is pressurized with vapor of solvent, melt assistant, or both at a pressure and temperature that are below the minimum values necessary to achieve the assisted melt but are sufficient to maintain controlled foaming of the film and the necessary plasticity to provide the necessary biaxial orientation. Such conditions are within the purview of the above-cited prior art.

After the film has been properly expanded, stretched, and solidified, it exits from the solidification zone into the atmosphere and may be dried to remove remaining solvent or melt assistant. Additional processing may be carried out as desired in accordance with prior art teachings and the only essential steps of the present invention are those given.

The following examples are set forth for purposes of illustration only and are not to be construed as limitations on the present invention except as set forth in the appended claims. All parts and percentages are by weight unless otherwise specified.

EXAMPLES 1-4

An acrylonitrile polymer composed of 91.3% acrylonitrile, 6.4% methyl methacrylate, and 2.3% methacrylic acid and having a kinematic molecular weight of 55,000 is mixed with 12% water (melt assistant), 17% propylene carbonate (polymer solvent) and 2% of an emulsion of polytetrafluoroethylene (PTFE) (30% polymer solids), the latter percentages based on the weight of acrylonitrile polymer. This composition is heated under autogenous pressure to 160° C. whereupon an assisted melt forms. The melt is extruded through a film-forming die having an inner diameter of 0.032 inch and an outer diameter of 0.075 inch. The jet velocity is 6 meters per minute and take-away speed is 8 meters per minute. The film enters directly into a steam-pressurized solidification zone maintained with saturated steam at 12 psig. As the film is extruded, air under pressure is entered into the center of the film through the die to expand the film in the transverse direction. The expansion pressures, film widths, and blow ratio are given for the examples indicated in the table which follows.

| Example | Air Pressure Inside Tubular Film (psig) | Width Of Film (in.) | Blow Ratio* |
|---|---|---|---|
| 1 | 1.25 | 0.62 | 2.6 |
| 2 | 2.00 | 0.80 | 3.3 |
| 3 | 3.00 | 1.25 | 5.3 |
| 4 | 4.00 | 1.87 | 7.9 |

*relative to unblown film.

In each example, the film produced contains small celled bubbles. The film is very thin and reinforced with fiber webs formed coincidental with film production. As shown in the table, the transverse blow ratio is an high as 7.9 which is surprising because the maximum draw-down stretch ratio obtainable is only about 2.

EXAMPLE 5

The procedure of Example 1 is again followed except that the polymer solvent is dimethyl sulfoxide. Similar results are achieved.

EXAMPLE 6

Again following the procedure of Example 1 except that the water is eliminated and the propylene carbonate concentration is 22%, an excellent film is recovered.

EXAMPLE 7

Following the procedure of Example 3 except that the polymer is polypropylene and the solvent is decalin, a film containing small celled bubbles and reinforced with PTFE fiber webs is recovered.

We claim:

1. A process for preparing a foamed film having both a textured surface and a fibrous web reinforcement which arise spontaneously in processing which comprises: preparing an assisted melt polymer composition comprising an effective amount of a polytetrafluoroethylene emulsion and the balance of one or more polymers selected from acrylonitrile and olefin polymers, said melt being obtained by using a polymer solvent alone, or a combination of a major amount of polymer solvent and a minor amount of melt assistant, in amounts insufficient to dissolve said polymer composition at ordinary temperature and pressure and, at a temperature above the boiling point of said polymer solvent or combination of polymer solvent and melt assistant at atmospheric pressure and at a pressure at least equal to autogenous pressure; extruding said melt through a film-forming die directly into a solidification zone pressurized with vapor of polymer solvent and/or melt assistant under conditions which produce a foamed film structure while enabling biaxial orientation of said film to be effected; and biaxially orienting said film structure while it remains within said solidification zone.

2. The process of claim 1 wherein said polymer is an acrylonitrile polymer.

3. The process of claim 1 wherein said polymer is a polyolefin.

4. The process of claim 3 wherein said polymer solvent is propylene carbonate.

5. The process of claim 3 wherein said melt assistant is water.

6. A biaxially oriented foamed film having an inherent textured surface and an inherent fibrous web reinforcement comprising a major amount of one or more polymers selected from acrylonitrile and olefin polymers and a minor amount of polytetrafluoroethylene, the amount of polytetrafluoroethylene being sufficient to provide said inherent properties.

7. The film of claim 6 wherein the selected polymer is an acrylonitrile polymer.

8. The film of claim 6 wherein the selected polymer is an olefin polymer.

* * * * *